United States Patent Office 3,353,451
Patented Nov. 21, 1967

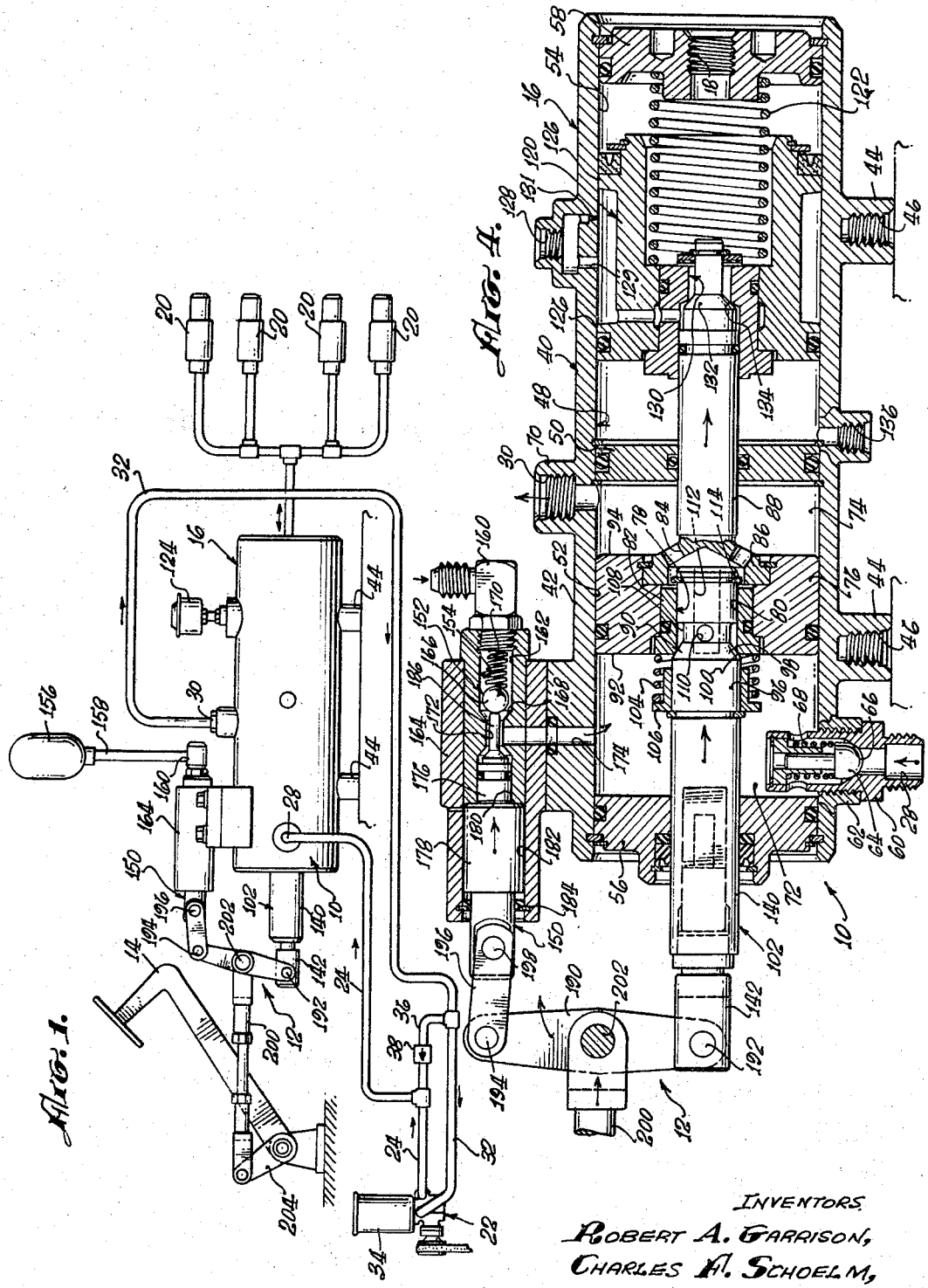

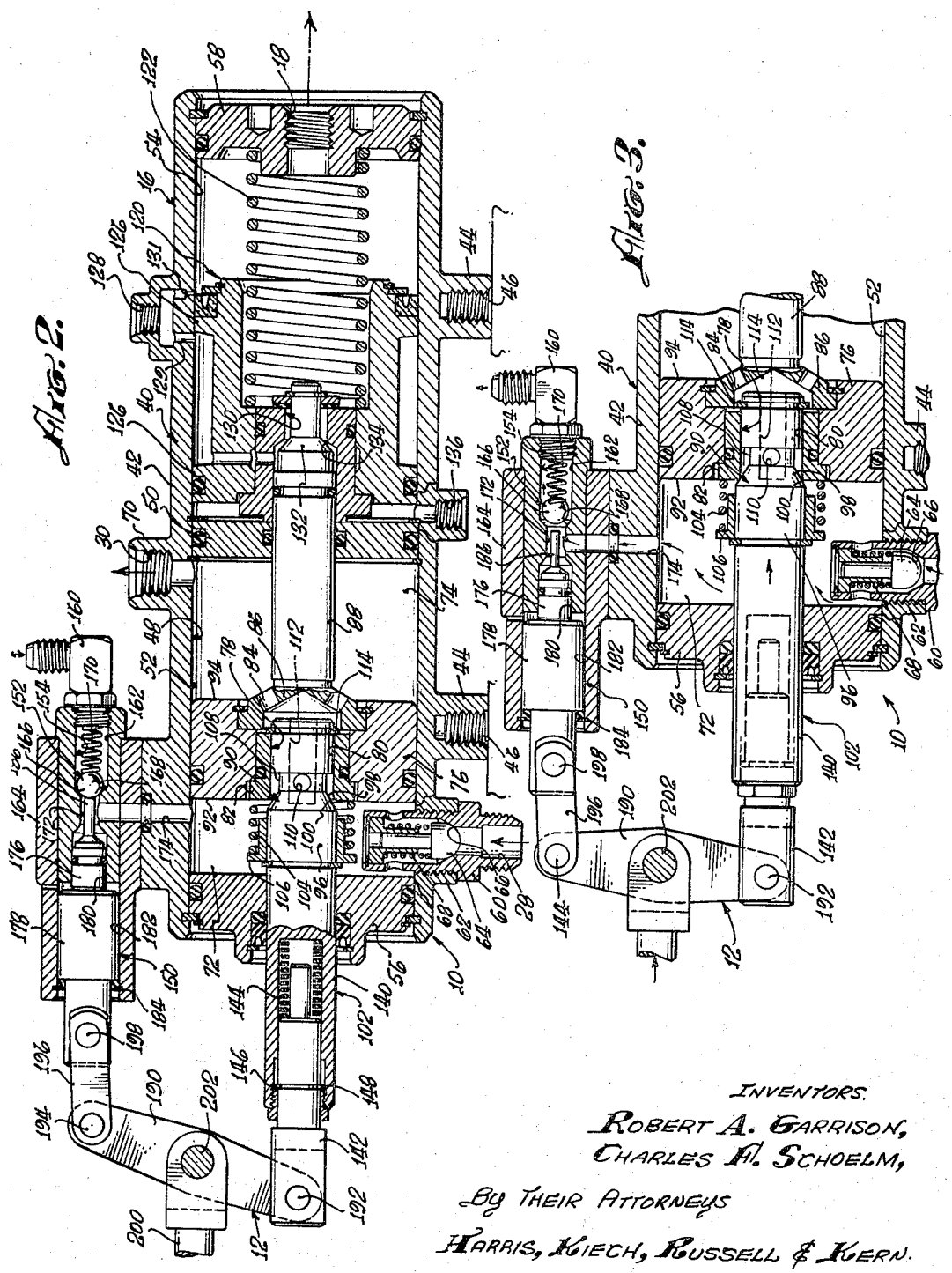

3,353,451
FLUID OPERATED BOOSTER HAVING AN ACCUMULATOR SAFETY SYSTEM
Robert A. Garrison, 735 Via Lido Soud, Newport Beach, Calif. 92660, and Charles F. Schoelm, Long Beach, Calif.; said Schoelm assignor to said Garrison
Filed Oct. 20, 1965, Ser. No. 498,303
10 Claims. (Cl. 91—6)

ABSTRACT OF THE DISCLOSURE

A hydraulic power brake equipped with an accumulator. A brake pedal closes a first valve to apply the output pressure of a hydraulic pump to a booster piston in the power brake to develop fluid pressure in the brake system and to pressurize the accumulator. In the event of failure of the hydraulic pressure from the pump, the brake pedal opens another valve to apply hydraulic pressure from the accumulator to the booster piston.

Background of invention

The present invention relates in general to a fluid operated booster for converting a manual, or other, input force into an amplified output force and, more particularly, to a fluid operated booster of the type wherein the input force and the force provided by the booster are added together in such a manner that the input force is always representative of the amplified output force, thereby providing the operator with the proper feel. While the fluid operated booster of the invention may be utilized wherever power-assisted motion is required, it is of particular utility when utilized to actuate a master cylinder of a hydraulic braking system, and will be considered in such connection herein for convenience.

Fluid operated boosters of the foregoing general character are disclosed in Patent No. 2,964,909, granted Dec. 20, 1960, to Robert A. Garrison, one of the present inventors, and in Patent No. 3,053,052, granted to us on Sept. 11, 1962. The present invention relates to improvements on the fluid operated boosters of such patents.

Summary and objects of invention

The primary object of the invention is to provide a fluid operated booster of the foregoing type having means for applying fluid pressure from an accumulator to a piston means of the booster in the event of failure of the normal source of operating fluid, i.e., in the event of failure of the engine of a vehicle in which the booster of the invention is installed, failure of a hydraulic pump driven by the engine, rupture of a hydraulic line between the pump and the booster, and the like.

More specifically, an important object of the invention is to provide a fluid operated booster comprising: housing means provided with cylinder means therein and provided with an inlet port; piston means reciprocable in the cylinder means; first valve means movable to an actuated position to apply fluid pressure in the inlet port to an area of the piston means; an accumulator; second valve means movable to an open position to apply fluid pressure in the accumulator to the aforementioned area of the piston means; and operating means for moving the first valve means to its actuated position and for moving the second valve means to its open position upon movement of the first valve means to its actuated position.

Still more specifically, an object of the invention is to provide a fluid operated booster which includes: housing means provided with cylinder means therein and provided therein with inlet and outlet ports which communicate with the cylinder means; piston means reciprocable in the cylinder means and having oppositely facing, inlet and outlet areas respectively communicating with the inlet and outlet ports; first passage means interconnecting the inlet and outlet areas and the inlet and outlet ports; normally open first valve means in the first passage means and progressively closable to progressively increase the fluid pressure applied to the inlet area; an accumulator; second passage means interconnecting the accumulator and the cylinder means for placing the accumulator in fluid communication with the inlet area; normally closed second valve means in the second passage means; and operating means for progressively closing the first valve means, and for opening the second valve means upon complete closure of the first valve means.

Another object is to locate the first passage means in the piston means, and to provide the first valve means with a valve seat facing in the same direction as the inlet area and a valve element movable axially of the cylinder means toward the valve seat to increase the restriction to fluid flow through the first passage means, and thus the fluid pressure applied to the inlet area. With this construction, the input force applied to the valve element of the first valve means and the force developed by the fluid pressure applied to the inlet area of the piston means are additive to produce the amplified output force, thereby providing the desired feel.

Still another object is to provide a fluid operated booster wherein the second valve means includes a second valve seat facing in the same direction as the outlet area of the piston means and includes a second valve element movable away from the second valve seat to open the second passage means so as to admit fluid under pressure from the accumulator into the cylinder means in communication with the inlet area of the piston means. With this construction, the valve elements of the two valve means are movable between their open and closed positions along parallel paths.

An important object of the invention is to provide an operating means for the two valve means which includes substantially parallel first and second push rods respectively connected to the first and second valve elements for respectively seating and unseating the first and second valve elements.

Another important object is to provide an operating means which includes a generally transverse operating lever pivotally connected at its ends to the first and second push rods and adapted to have an operating force applied thereto intermediate its ends, as by means of a brake pedal, or the like. With this construction, the operating lever pivots relative to one or the other of the two push rods as required to initially close the first valve means, and to then open the second valve means controlling flow from the accumulator upon complete closure of the first valve means.

Another object of the invention is to provide a fluid operated booster of the foregoing construction wherein the first push rod comprises telescopically interconnected sections and compression spring means biasing such sections apart. With this construction, the operator experiences a smooth relationship between input force and, for example, pedal travel, which is an important feature.

The foregoing objects, advantages, features and results of the present invention, together with various other objects, advantages, features and results thereof which will be evident to those skilled in the fluid operated booster art in the light of this disclosure, may be achieved with the exemplary embodiment of the invention described in detail hereinafter and illustrated in the accompanying drawings.

Description of drawings

In the drawings:

FIG. 1 is a diagrammatic view of a hydraulic vehicle-braking system which embodies the fluid operated booster of the invention;

FIG. 2 is a longitudinal sectional view of the fluid operated booster of the invention, showing the various parts thereof in the positions they occupy with no input force applied;

FIG. 3 is a fragmentary longitudinal sectional view duplicating a portion of FIG. 2, but illustrating the positions of various parts during recharging of the accumulator; and FIG. 4 is a longitudinal sectional view similar to FIG. 2, but illustrating the positions of the various parts upon application of an input force with a failure of the normal source of operating fluid under pressure.

Detailed description of preferred embodiment of invention

Referring initially to FIG. 1 of the drawings, the fluid operated booster of the invention is designated generally by the numeral 10 and includes an operating means 12 shown as connected to a brake pedal 14 of a truck, or other vehicle. When the pedal 14 is depressed by the driver's foot, the booster 10 actuates a master cylinder 16, FIGS. 2 and 4, to discharge an output fluid under pressure through an output port 18 connected to wheel cylinders 20.

In the braking system illustrated in FIG. 1, a pump 22 driven, for example, by the engine of the vehicle serves as the normal source of operating fluid under pressure for the booster 10. The operating fluid under pressure discharged by the pump 22 flows through a supply line 24 into an inlet port 28 of the booster 10. The latter is provided with an outlet port 30 to which is connected a return line 32 leading to a reservoir 34 associated with the pump 22. The supply and return lines 24 and 32 are interconnnected by a line 36 containing a check valve 38 permitting flow from the return line to the supply line. As will be discussed hereinafter, this permits drawing fluid from the reservoir 34 into the booster 10 when the pump 22 is not operating.

Although the return line 32 is shown as connecting the outlet port 30 directly to the reservoir 34, the outlet port may be connected to the reservoir through a power steering valve, as shown, for example, in the aforementioned Patent No. 2,964,909.

Considering the fluid operated booster 10 in more detail, it includes a housing means 40 comprising a tubular housing 42 provided with mounting bosses 44 having internally threaded mounting bores 46 therein.

The tubular housing 42 provides a cylinder means 48 divided by an intermediate annular partition 50 into a booster cylinder or booster cylinder bore 52 adjacent the input end of the booster 10, and a master cylinder bore 54 adjacent the output end of the booster. The booster cylinder 52 is closed at the input end of the booster 10 by an annular closure 56, and the master cylinder bore 54 is closed at the output end of the booster by a closure 58 having the output port 18 formed therein. The partition 50 and the closures 56 and 58 are suitably retained in and sealed relative to the tubular housing 42, as by means of snap rings and O-rings, respectively.

The inlet port 28 communicates with the booster cylinder 52 adjacent the input end of the booster 10 and is formed in an inlet fitting 60 threaded into a radial boss 62 on the housing 42. The inlet fitting 60 carries an inwardly-opening inlet check valve 64 biased outwardly against an annular seat 66 by a compression spring 68. With this construction, fluid can enter the booster cylinder 52 through the inlet fitting 60, but cannot escape therefrom in the event of failure of the line 24, the pump 22, the engine driving the pump, or the like.

The outlet port 30 is shown as formed in an integral radial boss 70 on the housing 42. The outlet port 30 communicates with the opposite end of the cylinder 52 from the inlet port 28.

The booster cylinder 52 is divided into inlet and outlet chambers 72 and 74, respectively communicating with the inlet and outlet ports 28 and 30, by a booster piston 76. Extending through the piston 76 is a first passage means 78 comprising an axial bore 80 in an axial insert 82 within the piston. The first passage means 78 also includes ports 84 in a flanged end 86 of a push rod 88 which extends axially through the annular partition 50 into the master cylinder bore 54 and is suitably sealed with respect to the annular piston. The flanged end 86 of the push rod 88 is suitably secured to the piston 76. The push rod 88 serves to actuate the master cylinder 16 in a manner to be described hereinafter.

It will be noted that the axial bore 80 and the ports 84 constituting the first passage means 78 permit operating fluid under pressure supplied by the pump 22 to flow from the inlet port 28 through the booster piston 76 to the outlet port 30. Such flow through the first passage means 78 is controlled by a first valve means 90 disposed in the first passage means and carried by the booster piston 76. The first valve means 90 is normally open to permit unrestricted flow of operating fluid from the inlet port 28 to the outlet port 30. The booster piston 76 is provided on opposite sides thereof with inlet and outlet areas 92 and 94 respectively facing the inlet and outlet ends of the booster cylinder 52. By progressively closing the first valve means 90 in a manner to be described, the fluid pressure applied to the inlet area 92 is progressively increased to bias the booster piston toward the outlet end of its cylinder. Upon complete closure of the first valve means 90, the fluid pressure in the inlet chamber 72 and acting on the inlet area 92 is equal to the discharge pressure of the pump 22.

Considering the first valve means 90 in more detail, it includes a first valve element 96 which extends axially into the bore 80 in the booster-piston insert 82 and which has a tapered annular shoulder 98 engageable with a first annular valve seat 100 at one end of the bore 80. The valve element 96 is connected to a first push rod 102 which forms part of the operating means 12 and which extends axially through the annular closure 56 into the inlet chamber 72 of the booster cylinder 52, the push rod 102 being suitably sealed relative to the annular closure. The valve means 90 is normally open, the tapered annular shoulder 98 being biased axially away from the valve seat 100 by a compression spring 104 seated at one end against the booster-piston insert 82 and at its other end against an annular flange 106 on the push rod 102.

When the valve means 90 is open, fluid in the inlet chamber 72 flows between the tapered annular shoulder 98 and the valve seat 100 into an external annular groove 108 in the valve element 96. From such groove, the fluid flows through radial ports 110 in the valve element 96 into an axial passage 112 therein, such axial passage communicating with the ports 84 leading to the outlet chamber 74 so that the fluid can return to the reservoir 34 through the port 30 and the line 32.

When the valve means 90 is fully open, a snap ring 114 on the valve element 96 engages the booster-piston insert 82 to limit relative displacement of the valve element and the booster piston 76 under the influence of the spring 104. Under such conditions, fluid can flow freely from the inlet chamber 72 to the outlet chamber 74 without applying any operating pressure to the booster-piston inlet area 92. However, as the push rod 102 displaces the tapered annular shoulder 98 toward and into engagement with the valve seat 100, the restriction to flow through the passage means 78 is progressively increased to infinity, thereby progressively increasing the fluid pressure acting on the inlet area 92 to the maxium which the pump 22 is capable of providing.

It will be noted that the valve seat 100 faces in the same direction as the booster-piston inlet area 92. Consequently, the movement of the push rod 102 necessary to move the tapered annular shoulder 98 toward the valve seat 100 is in the same direction as the movement of the booster piston 76 produced by the fluid pressure acting on the inlet area 92 thereof. In other words, the input force applied to the push rod 102 acts in the same direction as, and is added to, the force produced by the fluid pressure acting on the booster-piston inlet area 92. Consequently, the total output force applied to the output push rod 88 is the sum of the input force and the fluid pressure force acting on the booster piston 76. This provides a positive feel at the brake pedal 14.

It will be noted that the feel force fed back to the brake pedal 14 is proportional to the force provided by the spring 104 plus the force due to the fluid pressure in the inlet chamber 72 acting on the tapered annular shoulder 98 radially outwardly of the valve seat 100. More particularly, this fluid-pressure reaction force is equal to the fluid pressure in the inlet chamber 72 times the difference between the cross sectional area of the push rod 102 and the cross sectional area of the valve seat 100. Therefore, the fluid-pressure reaction force is always proportional to the fluid pressure in the inlet chamber 72, and thus bears a definite relationship to the amplified output force applied to the output push rod 88.

In the particular construction illustrated, the amplified output force actuates the master cylinder 16 to convert the amplified output force into hydraulic pressure at the output port 18. Considering the master cylinder 16 in more detail, it includes a master piston 120 reciprocable in the master cylinder bore 54 and biased away from the output port 18 by a compression spring 122. The master cylinder 16 includes a reservoir 124, FIG. 1, which communicates with the master cylinder bore 54 between lands 126 on the piston 120 through a port 128 and a passage 129. A passage means 130 in the master piston 120 connects the space between the lands 126 to the output end of the master cylinder bore 54 to admit fluid from the reservoir into the output end of such bore. (A passage 131 also connects the port 128 to the master cylinder bore 54 on the output side of the master piston 120 when the latter is fully retracted, FIG. 2.) Upon actuation of the master cylinder 16 by the output push rod 88, a tapered annular shoulder 132 on the output push rod engages an annular seat 134 formed in the master piston 120, and encircling the passage means 130, to trap a charge of hydraulic fluid in the output end of the master cylinder bore 54. When the booster is not actuated, the tapered annular shoulder 132 disengages the annular seat 134 to reestablish fluid communication between the master-cylinder reservoir 124 and the output end of the master cylinder bore 54. The housing 42 is provided with a vent port 136 which communicates with the master cylinder bore 54 adjacent the annular partitions 50. Such vent port may have a suitable breather attachment, not shown, connected thereto.

The push rod 102, as best shown in FIG. 2, includes telescopically connected inner and outer sections 140 and 142, the inner section 140 extending inwardly into the booster cylinder 52 and carrying the valve element 96. The outer section 142 is adapted to have a push input force applied thereto by the operating means 12 in a manner to be described hereinafter. The outer section 142 is telescoped into the inner section 140 and the two sections are biased axially apart by a compression spring 144 housed within the inner section 140 and seated against the respective sections 140 and 142 at its ends. Axial separation of the two sections 140 and 142 is prevented by engagement of a snap ring 146 on the outer section 142 with a shoulder 148 on the inner section 140.

With this construction for the push rod 102, a push input force applied to the outer section 142 is transmitted to the inner section 140, and thus to the valve element 96, through the compression spring 144. Thus, it is necessary to compress the spring 144 to overcome the spring 104 and the reaction force produced by the action of the fluid pressure in the inlet chamber 72 on the tapered annular shoulder 98 radially outwardly of the valve seat 100. In other words, the fluid-pressure reaction force is balanced against the compression spring 144 and provides a smoothly-increasing pedal force as the brake pedal 14 is depressed.

Extending in the same direction as and paralleling the first push rod 102 is a second push rod 150 for opening a normally closed second valve means 152 controlling flow through a second passage means 154 between the inlet chamber 72 of the booster cylinder 52 and an accumulator 156, FIG. 1. More particularly, the accumulator 156 is shown as connected by a line 158 to an elbow fitting 160 threaded into a counterbore 162 in a housing 164 bolted, or otherwise secured, to the housing 42 adjacent the input end thereof. Disposed in the counterbore 162 is a second valve element, shown as a ball valve 166, which is biased into engagement with a second annular valve seat 168 by a compression spring 170 seated against the ball valve and against the elbow fitting 160. The valve seat 168 is formed at the junction of the counterbore 162 with a bore 172, the latter being connected to the inlet chamber 72 by a passage 174 in the housings 42 and 164.

As will be apparent, when the ball valve 166 is unseated, fluid may flow from the inlet chamber 72 to the accumulator 156 if the fluid pressure in the inlet chamber is higher than that in the accumulator. However, if the fluid pressure in the accumulator is higher than that in the inlet chamber 72 when the ball valve 166 is unseated, fluid will flow from the accumulator to the inlet chamber to act on the booster-piston inlet area 92, as will be described hereinafter. The ball valve 166 may be unseated either by a fluid pressure in the inlet chamber 72 higher than that in the accumulator 156, or by the push rod 150, as will now be described.

The push rod 150 comprises inner and outer plungers 176 and 178 respectively reciprocable in inner and outer counterbores 180 and 182 in the housing 164. The inner plunger 176 is suitably sealed relative to its counterbore 180, and withdrawal of the push rod 150 is prevented by a snap ring 184 engageable by the outer plunger 178. The inner plunger 176 terminates in a stem 186 which projects through the bore 172 and is engageable with the ball valve 166 to unseat it upon movement of the push The two push rods 102 and 150 are selectively movable rod 150 toward the right, as viewed in the drawings. by a generally transverse, operating link or lever 190 which is pivotally connected at one end to the outer end of the push rod 102 by a pivot pin 192. The other end of the operating lever 190 is connected by a pivot pin 194 to a short link 196 which, in turn, is pivotally connected to the outer end of the second push rod 150 by a pivot pin 198. The purpose of the link 196 between the operating lever 190 and the second push rod 150 is to permit differential movement of the push rods 102 and 150 upon application of a push input force to the operating lever toward the right, as viewed in the drawings. Such an input force is adapted to be applied to the operating lever 190 by an operating link 200 pivotally connected to the operating lever intermediate its ends by a pivot pin 202. The other end of the link 200 is pivotally connected to a crank arm 204 secured to the brake pedal 14. As will be apparent, when the brake pedal 14 is depressed, the operating link 200 applies a push input force to the operating lever 190, which push input force is selectively applied to the two valve means 90 and 152, as will now be described.

Considering the operation of the booster 10 of the invention, with no input force applied to the brake pedal 14, the various parts are in the positions shown in FIG. 2 of the drawings. More specifically, the first valve means 90 is open to permit through flow of fluid discharged by the pump 22 from the inlet port 28 to the outlet port 30 and back to the reservoir 34. The second valve means 152 controlling flow between the booster-cylinder inlet chamber 72 and the accumulator 156 is closed.

To actuate the wheel cylinders 20 when operating fluid under pressure is available at the inlet port 28, the operator depresses the brake pedal 14. Assuming that the accumulator 156 is under pressure, no movement of the push rod 150 occurs, being resisted by the accumulator pressure acting on the ball valve 166. Consequently, the operating lever 190 pivots about the pivot pin 194 to displace the push rod 102 in a direction to at least partially close the valve means 90. This results in an increased pressure in the inlet chamber 72. Such increased pressure in the inlet chamber 72 is applied to the tapered annular shoulder 98 to provide the aforementioned feel-producing reaction force, and is also applied to the inner plunger 176 of the push rod 150 to further resist movement of such push rod in a direction to unseat the ball valve 166. The increased fluid pressure in the inlet chamber 72 also acts on the inlet area 92 of the booster piston 76 and thus applies an amplified output force to the master piston 120 to deliver hydraulic fluid under pressure to the wheel cylinders 20, thereby applying the brakes of the vehicle. As will be apparent, the amplified output pressure increases as the valve means 90 is progressively closed, reaching a maximum upon complete closure of such valve means.

Referring to FIG. 3 of the drawings, the accumulator 156 may be charged by depressing the brake pedal 14 sufficiently to cause the operating lever 190 to displace the push rod 102 sufficiently to fully close the valve means 90. When this occurs, the full output pressure of the pump 22 acts on the ball valve 160 to unseat it, thereby permitting fluid to flow from the pump 22 into the accumulator 156. When the accumulator pressure reaches the pump discharge pressure, the ball valve 166 reseats.

FIG. 4 illustrates the conditions obtaining when the brake pedal 14 is depressed with no operating fluid under pressure available from the pump 22, due, for example, to failure of the pump, failure of the engine driving it, failure of the fluid line 24, or the like. Initially, the push input force applied to the operating lever 190 under such circumstances displaces the push rod 102 to close the valve means 90 and to begin to displace the booster piston 76, and the master piston 120, mechanically. (As the booster piston 76 is displaced in this manner, replacement fluid is drawn into the inlet chamber 72 from the reservoir 34 past the check valves 38 and 64.) Since, under these conditions, there is no fluid pressure in the inlet chamber 72, the resistance to displacement of the push rod 150 is only that due to the accumulator pressure and spring force acting on the ball valve 166. Consequently, the operating lever 190 can pivot about the pivot pin 192 to cause the push rod 150 to unseat the ball valve 166. Thereupon, fluid from the accumulator 156 flows through the passage means 154 into the inlet chamber 72 to act on the inlet area 92 of the booster piston 76, the check valve 64 seating to prevent back flow into the line 24. Under failure conditions, therefore, the pressure in the accumulator 156 is utilized to operate the booster 10 to cause it to actuate the master cylinder 16. Preferably, the capacity of the accumulator 156 is sufficient to provide for several brake applications before the pressure in the accumulator is dissipated.

It will be noted that the construction of the operating means 12 is such that the operating lever 190 displaces only the push rod 102 in response to the application of a push input force, as long as the accumulator 156 is charged, and as long as normal fluid pressure is available at the inlet port 28. However, of the accumulator 156 is not charged, and normal fluid pressure is available at the inlet port 28, the ball valve 166 automatically unseats to build up the pressure in the accumulator to that existing in the inlet port 72. Under such conditions, the push rod 150 remains stationary because of the action of the fluid pressure in the inlet chamber 72 on the inner plunger 176 of the push rod 150. Only in the even of a lack of normal pressure at the inlet port 28 can a push input force applied to the operating lever 190 displace the push rod 150. Under these conditions, the push rod 150 can be displaced since there is no fluid pressure in the inlet chamber 72 to resist such displacement.

Although an exemplary embodiment of the invention has been disclosed herein for purposes of illustration, it will be understood that various changes, modifications and substitutions may be incorporated in such embodiment without departing from the spirit of the invention as defined by the claims appearing in the next section hereof.

We claim as our invention:

1. In a fluid operated booster, the combination of:
 (a) housing means provided with cylinder means therein and provided with an inlet port;
 (b) piston means reciprocable in said cylinder means;
 (c) first valve means movable to an actuated position to apply fluid pressure in said inlet port to an area of said piston means;
 (d) an accumulator;
 (e) second valve means movable to an open position to apply fluid pressure in said accumulator to said area of said piston means;
 (f) said second valve means being spaced from and being structurally separate from said first valve means;
 (g) means biasing said second valve means closed; and
 (h) lever means mechanically interconnecting said first and second valve means for moving said first valve means to said actuated position and for moving said second valve means to said open position upon movement of said first valve means to said actuated position.

2. In a fluid operated booster, the combination of:
 (a) housing means provided with cylinder means therein and provided therein with inlet and outlet ports which communicate with said cylinder means;
 (b) piston means reciprocable in said cylinder means and having oppositely facing, inlet and outlet areas respectively communicating with said inlet and outlet ports;
 (c) first passage means interconnecting said inlet and outlet areas and said inlet and outlet ports;
 (d) normally open first valve means in said first passage means and progressively closable to progressively increase the fluid pressure applied to said inlet area;
 (e) an accumulator;
 (f) second passage means interconnecting said accumulator and said cylinder means for placing said accumulator in fluid communication with said inlet area;
 (g) second valve means in said second passage means;
 (h) said second valve means being spaced from and being structurally separate from said first valve means;
 (i) means biasing said second valve means closed; and
 (j) lever means mechanically interconnecting said first and second valve means for progressively closing said first valve means, and for opening said second valve means upon complete closure of said first valve means.

3. In a fluid operated booster, the combination of:
 (a) housing means provided with cylinder means therein and provided therein with inlet and outlet ports which communicate with said cylinder means;
 (b) piston means reciprocable in said cylinder means and having oppositely facing, inlet and outlet areas respectively communicating with said inlet and outlet ports;

(c) first passage means in said piston means and interconnecting said inlet and outlet areas and said inlet and outlet ports;

(d) normally open first valve means in said first passage means and carried by said piston means and progressively closable to progressively increase the fluid pressure applied to said inlet area;

(e) an accumulator;

(f) second passage means interconnecting said accumulator and said cylinder means for placing said accumulator in fluid communication with said inlet area;

(g) second valve means in said second passage means;

(h) said second valve means being spaced from and being structurally separate from said first valve means;

(i) means biasing said second valve means closed; and (j) lever means mechanically interconnecting said first and second valve means for progressively closing said first valve means, and for opening said second valve means upon complete closure of said first valve means.

4. In a fluid operated booster, the combination of:

(a) housing means provided with cylinder means therein and provided therein with inlet and outlet ports which communicate with said cylinder means;

(b) piston means reciprocable in said cylinder means and having oppositely facing, inlet and outlet areas respectively communicating with said inlet and outlet ports;

(c) first passage means in said piston means and interconnecting said inlet and outlet areas and said inlet and outlet ports;

(d) normally open first valve means in said first passage means and carried by said piston means for regulating fluid flow through said first passage means from said inlet port to said outlet port;

(e) said first valve means including a first valve seat facing in the same direction as said inlet area and including a first valve element movable axially of said cylinder means toward said first valve seat to increase the restriction to fluid flow through said first passage means;

(f) an accumulator;

(g) second passage means interconnecting said accumulator and said cylinder means for placing said accumulator in fluid communication with said inlet area;

(h) second valve means in said second passage means;

(i) said second valve means being spaced from and being structurally separate from said first valve means;

(j) means biasing said second valve means closed; and (k) lever means mechanically interconnecting said first and second valve means for moving said first valve element toward said first valve seat to progressively close said first valve means, and for opening said second valve means upon complete closure of said first valve means.

5. In a fluid operated booster, the combination of:

(a) housing means provided with cylinder means therein and provided therein with inlet and outlet ports which communicate with said cylinder means;

(b) piston means reciprocable in said cylinder means and having oppositely facing, inlet and outlet areas respectively communicating with said inlet and outlet ports;

(c) first passage means in said piston means and interconnecting said inlet and outlet areas and said inlet and outlet ports;

(d) normally open first valve means in said first passage means and carried by said piston means for regulating fluid flow through said first passage means for said inlet port to said outlet port;

(e) said first valve means including a first valve seat facing in the same direction as said inlet area and including a first valve element movable axially of said cylinder means toward said first valve seat to increase the restriction to fluid flow through said first passage means;

(f) an accumulator;

(g) second passage means in said housing means and interconnecting said accumulator and said cylinder means for placing said accumulator in fluid communication with said inlet area;

(h) normally closed second valve means in said second passage means;

(i) said second valve means being spaced from and being structurally separate from said first valve means and including a second valve seat facing in the same direction as said outlet area and including a second valve element movable away from said second valve seat to open said second passage means, and further including means biasing said second valve element toward said second valve seat; and (j) lever means mechanically interconnecting said first and second valve elements for moving said first valve element toward said first valve seat to progressively close said first valve means, and for moving said second valve element away from said second valve seat, to open said second valve means, upon complete closure of said first valve means.

6. In a fluid operated booster, the combination of:

(a) housing means provided with cylinder means therein and provided therein with inlet and outlet ports which communicate with said cylinder means;

(b) piston means reciprocable in said cylinder means and having oppositely facing, inlet and outlet areas respectively communicating with said inlet and outlet ports;

(c) first passage means in said piston means and interconnecting said inlet and outlet areas and said inlet and outlet ports;

(d) normally open first valve means in said first passage means and carried by said piston means for regulating fluid flow through said first passage means from said inlet port to said outlet port;

(e) said first valve means including a first valve seat facing in the same direction as said inlet area and including a first valve element movable axially of said cylinder means toward said first valve seat to increase the restriction to fluid flow through said first passage means;

(f) an accumulator;

(g) second passage means in said housing means and interconnecting said accumulator and said cylinder means for placing said accumulator in fluid communication with said inlet area;

(h) normally closed second valve means in said second passage means;

(i) said second valve means being spaced from and being structurally separate from said first valve means and including a second valve seat facing in the same direction as said outlet area and including a second valve element movable away from said second valve seat to open said second passage means, and further including means biasing said second valve element toward said second valve seat;

(j) operating means mechanically interconnecting said first and second valve elements for moving said first valve eleemnt toward said first valve seat to progressively close said first valve means, and for moving said second valve element away from said second valve seat, to open said second valve means, upon complete closure of said first valve means;

(k) said operating means including substantially parallel first and second push rods carried by said housing means and respectively connected to said first and second valve elements; and (l) said operating means including an operating lever pivtally connected to said first and second push rods.

7. In a fluid operated booster, the combination of:
(a) housing means provided with cylinder means therein and provided therein with inlet and outlet ports which communicate with said cylinder means;
(b) piston means reciprocable in said cylinder means and having oppositely facing, inlet and outlet areas respectively communicating with said inlet and outlet ports;
(c) first passage means in said piston means and interconnecting said inlet and outlet areas and said inlet and outlet ports;
(d) normally open first valve means in said first passage means and carried by said piston means for regulating fluid flow through said first passage means from said inlet port to said outlet port;
(e) said first valve means including a first valve seat facing in the same direction as said inlet area and including a first valve element movable axially of said cylinder means toward said first valve seat to increase the restriction to fluid flow through said first passage means;
(f) an accumulator;
(g) second passage means in said housing means and interconnecting said accumulator and said cylinder means for placing said accumulator in fluid communication with said inlet area;
(h) normally closed second valve means in said secon passage means;
(i) said second valve means being spaced from and being structurally separate from said first valve means and including a second valve seat facing in the same direction as said outlet area and including a second valve element movable away from said second valve seat to open said second passage means, and further including means biasing said second valve element toward said second valve seat;
(j) operating means mechanically interconnecting said first and second valve elements for moving said first valve element toward said first valve seat to progressively close said first valve means, and for moving said second valve element away from said second valve seat, to open said second valve means, upon complete closure of said first valve means;
(k) said operating means including substantially parallel first and second push rods carried by said housing means and respectively connected to said first and second valve elements;
(l) said operating means including an operating lever pivotally connected to said first and second push rods;
(m) said first push rod comprising telescopically interconnected sections; and
(n) compression spring means in said first push rod and biasing said sections thereof apart.

8. In a fluid operated booster, the combination of:
(a) housing means provided with cylinder means therein and provided therein with inlet and outlet ports which communicate with said cylinder means;
(b) piston means reciprocable in said cylinder means and having oppositely facing, inlet and outlet areas respectively communicating with said inlet and outlet ports;
(c) first passage means interconnecting said inlet and outlet areas and said inlet and outlet ports;
(d) normally open first valve means in said first passage means and progressively closable to progressively increase the fluid pressure applied to said inlet area;
(e) an accumultor;
(f) second passage means interconnecting said accumulator and said cylinder means for placing said accumulator in fluid communication with said inlet area;
(g) second valve means in said second passage means;
(h) said second valve means being spaced from and being structurally separate from said first valve means;
(i) means biasing said second valve means closed;
(j) lever means mechanically interconnecting said first and second valve means for progressively closing said first valve means, and for opening said second valve means upon complete closure of said first valve means; and
(k) output means connected to said piston means.

9. In a fluid operated booster, the combination of:
(a) housing means provided with cylinder means therein and provided therein with inlet and outlet ports which communicate with said cylinder means;
(b) piston means reciprocable in said cylinder means and having oppositely facing, inlet and outlet areas respectively communicating with said inlet and outlet ports;
(c) first passage means interconnecting said inlet and outlet areas and said inlet and outlet ports;
(d) normally open first valve means in said first passage means and progressively closable to progressively increase the fluid pressure applied to said inlet area;
(e) an accumulator;
(f) second passage means interconnecting said accumulator and said cylinder means for placing said accumulator in fluid communication with said inlet area;
(g) second valve means in said second passage means;
(h) said second valve means being spaced from and being structurally separate from said first valve means;
(i) means biasing said second valve means closed;
(j) lever means mechanically interconnecting said first and second valve means for progressively closing said first valve means, and for opening said second valve means upon complete closure of said first valve means; and
(k) hydraulic output means connected to said piston means.

10. In a fluid operated booster, the combination of:
(a) housing means provided with cylinder means therein and provided therein with inlet and outlet ports which communicate with said cylinder means;
(b) piston means reciprocable in said cylinder means and having oppositely facing, inlet and outlet areas respectively communicating with said inlet and outlet ports;
(c) first passage means in said piston means and interconnecting said inlet and outlet areas and said inlet and outlet ports;
(d) normally open first valve means in said first passage means and carried by said piston means for regulating fluid flow through said first passage means from said inlet port to said outlet port;
(e) said first valve means including a first valve seat facing in the same direction as said inlet area and including a first valve element movable axially of said cylinder means toward said first valve seat to increase the restriction to fluid flow through said first passage means;
(f) an accumulator;
(g) second passage means in said housing means and interconnecting said accumulator and said cylinder means for placing said accumulator in fluid communication with said inlet area;
(h) normally closed second valve means in said second passage means being spaced from and being structurally separate from said first valve means and;
(i) said second valve means including a second valve seat facing in the same direction as said outlet area and including a second valve element movable away from said second valve seat to open said second passage means, and further including means biasing said second valve element toward said second valve seat;

(j) operating means mechanically interconnecting said first and second valve elements for moving said first valve element toward said first valve seat to progressively close said first valve means, and for moving said second valve element away from said second valve seat, to open said second valve means, upon complete closure of said first valve means;

(k) said operating means including substantially parallel first and second push rods carried by said housing means and respectively connected to said first and second valve elements;

(l) said operating means including an operating lever pivotally connected to said first and second push rods; and (m) means for applying a fluid pressure acting on said inlet area to said first and second push rods in directions to resist displacement of said first and second valve elements thereby.

References Cited

UNITED STATES PATENTS

| | | | |
|---|---|---|---|
| 2,908,137 | 10/1959 | Spalding | 60—52 |
| 2,934,041 | 4/1960 | Ayers | 60—52 |
| 2,945,352 | 7/1960 | Stelzer | 60—51 X |
| 3,044,405 | 7/1962 | Bent | 60—51 |
| 3,114,580 | 12/1963 | MacDuff | 60—51 |
| 3,131,538 | 5/1964 | Schultz | 60—52 |

MARTIN P. SCHWADRON, *Primary Examiner.*

B. L. ADAMS, *Assistant Examiner.*

UNITED STATES PATENT OFFICE
CERTIFICATE OF CORRECTION

Patent No. 3,353,451                        November 21, 1967

Robert A. Garrison et al.

It is hereby certified that error appears in the above numbered patent requiring correction and that the said Letters Patent should read as corrected below.

Column 6, line 49, strike out "rod 150 toward the right, as viewed in the drawings." and insert the same after "push" in line 47, same column 6; column 7, line 71, for "of" read -- if --; column 8, line 3, for "even" read -- event --; column 10, line 75, for "pivtally" read -- pivotally --; column 12, lines 68 and 69, strike out "being spaced from and being structurally separate from said first valve means and" and insert the same after "means" in line 70, same column 12.

Signed and sealed this 7th day of January 1969.

(SEAL)
Attest:

Edward M. Fletcher, Jr.                        EDWARD J. BRENNER

Attesting Officer                               Commissioner of Patents